Patented May 9, 1939

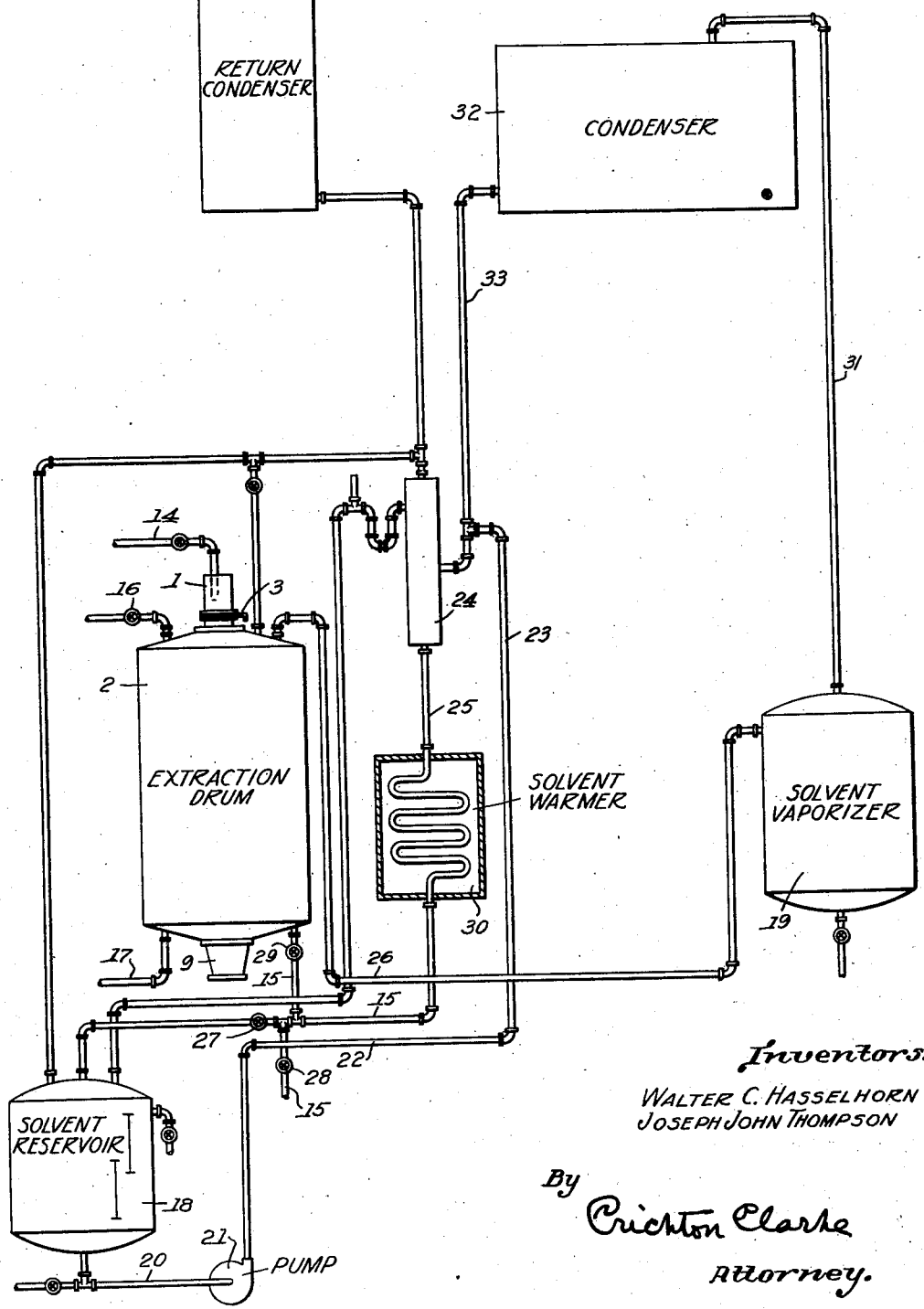

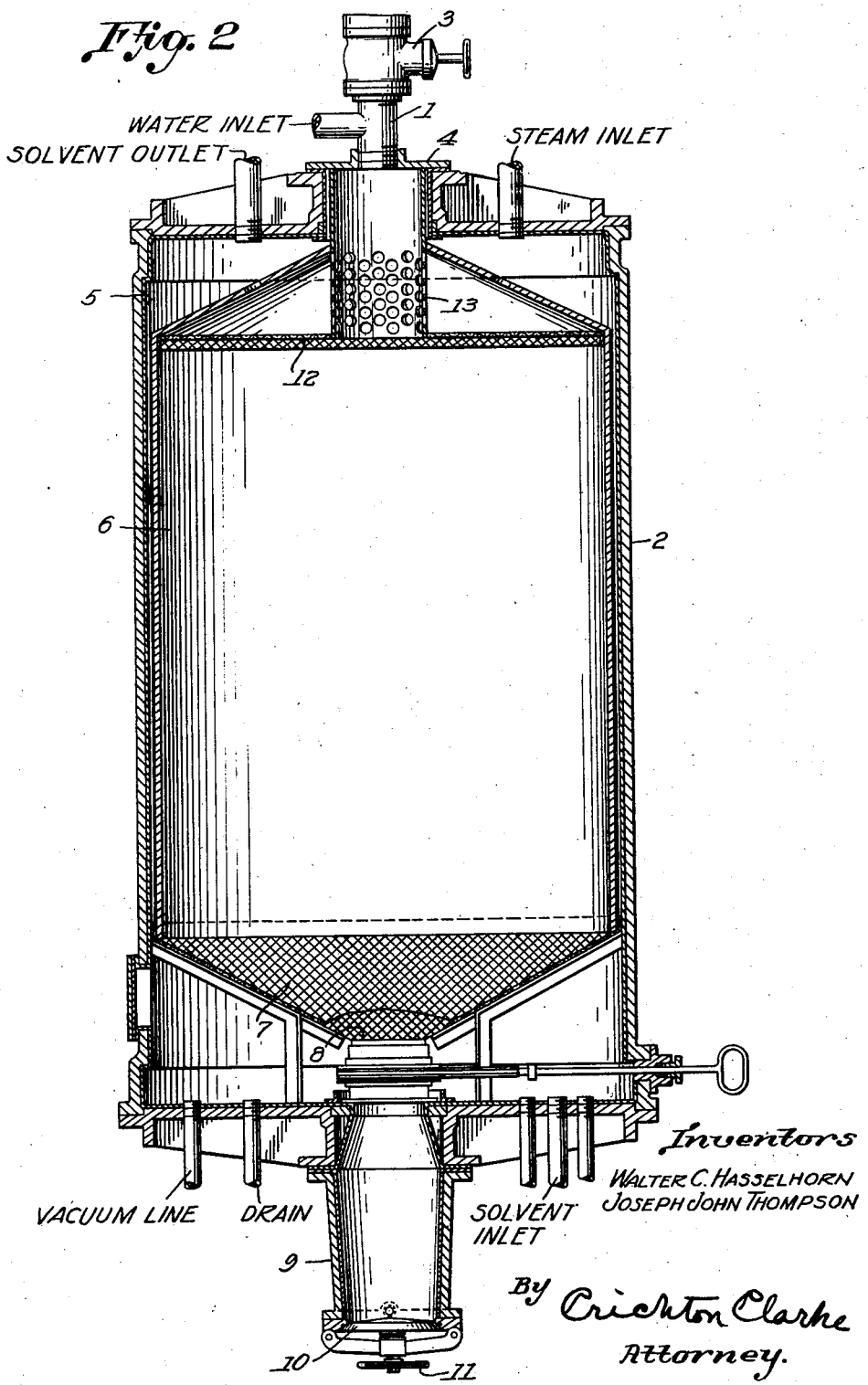

2,157,956

UNITED STATES PATENT OFFICE 2,157,956

PROCESS FOR THE DECAFFEINATION OF COFFEE

Walter C. Hasselhorn and Joseph John Thompson, Battle Creek, Mich., assignors to Kellogg Company, Battle Creek, Mich., a corporation of Delaware Application February 12, 1938, Serial No. 190,344

3 Claims. (Cl. 99—70)

This invention relates to a process and apparatus for the decaffeination of coffee.

The object of the invention is to provide a decaffeination process which is applicable for use on grades of coffee to which, so far as we are aware, no previously existing process has been capable of successful application or use.

An apparatus suitable for carrying out the process of the present invention is illustrated in the accompanying drawings in which reference numerals indicate corresponding parts in the different figures of the drawings.

In the drawings:

Figure 1 is a diagrammatical illustration of the necessary equipment.

Figure 2 is a cross section showing the extraction drum in vertical section.

Referring to Figure 1 of the drawings, the reference numeral 1 indicates a downward chute by which the green coffee beans are introduced into an extraction drum 2.

After the charge of green coffee beans has been introduced into the extraction drum 2, a valve 3 is closed.

The detailed construction of the drum 2 is illustrated in Figure 2 of the drawings, in which the chute 1 is threaded into the cover plate 4 which is suitably fixed to the top of the drum 2. Said drum 2 is lined completely with Monel metal 5 so as to resist the chemical action of the solvent during the decaffeination process. Said drum 2 contains a chamber 6 made either of wood or metal and separated from 5 by approximately 1" space.

Within the lower portion of the extraction drum 2 is a funnel-shaped screen 7 having an opening 8 at its center, which communicates with an outlet pipe 9 closed at its bottom by a fluid tight valve 10 held tightly in place by the handwheel 11.

At the top portion of the extraction drum 2 is a perforated Monel metal screen 12 connected to downward chute 1 by a perforated cylinder 13.

(Figure #1.) Water is supplied to the extraction drum 2 through the water supply pipe 14 and is discharged through line 15.

Steam is supplied to drum 2 through a steam pipe 16 which connects with any suitable source of steam supply and passes to the top of the extraction drum 2 and is discharged through the vacuum line 17.

Any suitable caffeine solvent, such as trichlorethylene, is contained in the solvent reservoir 18, from which it supplies the extraction drum 2 and the solvent vaporizer 19 through pipe 20, pump 21 and pipes 22, 23, 24, 25, 15 and 26.

A drain pipe 15, passing through valve 27 with valve 28 closed, discharges the solvent back into the solvent reservoir 18.

In using the apparatus of the present invention for carrying out the process, the coffee beans are first cleaned with a blower to remove as much as possible the dirt and extraneous material.

The green coffee beans are then supplied to the extraction drum through a screw conveyor and pipe 1. The moisture content of the beans, when fed into the extraction drum 2, is about 10%.

The beans lie in the drum 2 and are supported by the perforated screen 7. The drum 2 is filled approximately three quarters full of the cold unheated beans.

Cold water is then fed into the extraction drum 2 through the pipe 14 until the beans are just covered by the water and immersed therein.

The beans are permitted to stand in the cold water at a temperature of approximately 68 degrees Fahr. for approximately one hour. This immersion of the beans in relatively cold water serves, not only to wash the outside surface of the beans, but causes what may be called a surface absorption of water, which increases the water content of the beans from about 10% to around 21% or 22%, but the bean is not as yet uniformly permeated with water.

After the drum 2 has been filled with cold water to the level of the coffee beans therein and after the beans have been permitted to stand in the water for approximately one hour, as previously described, the water is discharged through pipe 15, then steam is supplied through pipe 16 connected with any suitable source of steam supply.

At the time the steam is first admitted to the drum 2, the coffee, having a moisture content of approximately 21% or 22%, reaches a temperature of approximately 205 degrees Fahr. in about 45 minutes, at which temperature it is held for ten minutes, after which the steam temperature is lowered to around 197 degrees to 200 degrees Fahr. and maintained at that low a temperature for about four hours.

This steam treatment of the coffee beans leaves them with a water content of from 20% to 22%, which is distributed more or less evenly throughout the bean.

The steam is then shut off and the bottom pipe 9 is opened to drain off any accumulated moisture.

The solvent from the reservoir 18 is then passed through the pump 21, pipes 22, 23, 24, 25, 15, valve 29 and pipe 26 into the solvent vaporizer 19. When drum 2 and solvent vaporizer 19 have sufficient solvent, the reservoir supply is discontinued. The solvent passes through a hot water heater 30 whereby the solvent is heated to approximately 140 degrees Fahr. The hot solvent passes upward through the unagitated mass of coffee beans which have been swollen under the cold water washing and subsequent steam treatment.

The solvent carrying the extracted matter, which includes caffeine, coffee wax and other extractive matter and impurities leaves the extraction drum at the top through the exit pipe 26 and passes into the upper portion of the solvent vaporizer 19, wherein the solvent is suitably heated and driven off as vapor through the pipe 31 to the condenser 32, from which the condensed solvent passes back by way of pipes 33, 24, 25, 15 and 26, valves 28 and 27 being closed.

The solvent is circulated from solvent vaporizer 19 through solvent warmer 30, extraction drum 2, for approximately thirty-two hours at a temperature of approximately 140 degrees Fahr.

By this time the solvent is clear because practically all of the caffeine has been extracted from the green coffee.

The solvent remaining in the extraction drum 2 is now drained back into the solvent reservoir 18 by pipe 15 with valve 27 open.

The green coffee in the extraction drum 2 is now of a moisture content of 18%.

After all the solvent that is capable of being drained off of the coffee beans has been drained back to the solvent reservoir 18, the remainder of the solvent which is still contained within the washed coffee beans is driven from the beans by again passing steam through the extraction drum 2 at a temperature of around 160 degrees to 170 degrees Fahr. This is continued for approximately twenty hours.

Where the process is carried out with a high grade coffee bean having no constituent capable of producing disagreeable flavor or odor, it is only necessary to use steam alone in steaming out the solvent, but where a lower grade of coffee bean is employed, such as an African bean, we have discovered that it is necessary to supply air to the extraction drum 2 along with the steam.

Air is supplied to the steam line 16 in any suitable manner, the air may be let in either under the Venturi principle or it may be compressed and thus fitted to the steam line on the supercharger principle.

In using African coffee, approximately 13.6 cubic feet of air per hour in conjunction with 52.7 cubic feet per hour of steam are supplied.

The air tends to oxidize some of the undesirable compounds present in the African and similar grades of coffee.

After the steam and air treatment is discontinued, any liquid remaining in the extraction drum 2 is first drawn off through the outlet 9, then the decaffeinated coffee is removed from the extraction drum 2 through outlet 9, and thereafter it is sent to the roasting, grinding and packing mechanism.

What is claimed as new is:

1. A method of extracting caffeine from coffee which consists in subjecting the coffee beans in a confined space to the action of relatively cold water to produce a surface absorption of water, withdrawing the water and subjecting the beans to steam thereby evenly distributing the water content throughout the beans, draining off the moisture from the beans, subjecting the beans without agitation to an upward circulation of hot solvent, withdrawing all of the solvent except that contained in the beans and subjecting the coffee beans again to the action of steam to remove the remaining solvent.

2. A method of extracting caffeine from coffee which comprises subjecting the coffee beans to the action of relatively cold water to produce a surface absorption of water, withdrawing the water and subjecting the beans to steam thereby evenly distributing the water content throughout the beans, draining off the moisture from the beans, subjecting the beans to extraction with a hot solvent, withdrawing all of the solvent except that contained within the beans and subjecting the coffee beans to the combining action of steam and air to remove the remaining solvent.

3. A method of extracting caffeine from coffee which comprises subjecting the coffee beans to the action of cold water at a temperature of approximately 68° F. until the beans have a water content of approximately 21 to 22 per cent, withdrawing the water and subjecting the beans to steam at a temperature of approximately 200° F. for about 4 hours thereby evenly distributing the water content throughout the beans, draining off the moisture from the beans, subjecting the beans to extraction with a hot solvent, withdrawing all of the solvent except that contained in the beans and subjecting the coffee beans again to the action of steam to remove the remaining solvent.

WALTER C. HASSELHORN.
JOSEPH JOHN THOMPSON.